US012636759B2

(12) United States Patent
Whitney

(10) Patent No.: US 12,636,759 B2
(45) Date of Patent: May 26, 2026

(54) SPROCKET WRENCH WITH CLAMP

(71) Applicant: Ross Whitney, New River, AZ (US)

(72) Inventor: Ross Whitney, New River, AZ (US)

( * ) Notice: Subject to any disclaimer, the term of this patent is extended or adjusted under 35 U.S.C. 154(b) by 432 days.

(21) Appl. No.: 18/332,996

(22) Filed: Jun. 12, 2023

(65) Prior Publication Data

US 2023/0405771 A1 Dec. 21, 2023

Related U.S. Application Data

(60) Provisional application No. 63/366,388, filed on Jun. 14, 2022.

(51) Int. Cl.
*B25B 13/52* (2006.01)
*B25B 27/00* (2006.01)

(52) U.S. Cl.
CPC .......... *B25B 13/52* (2013.01); *B25B 27/0071* (2013.01)

(58) Field of Classification Search
CPC ....... B25B 13/52; B25B 27/0071; B25B 5/00; B25B 5/067; B25B 5/082; B25B 5/101; B25B 5/125
USPC .................... 81/65.2–65.4; 78/78.1; 76/78.1; 24/600.6, 37; 403/293, 349; 59/53, 95, 59/85
See application file for complete search history.

(56) References Cited

U.S. PATENT DOCUMENTS

| | | | | |
|---|---|---|---|---|
| 412,176 | A * | 10/1889 | Griffin | B23D 51/10 30/507 |
| 1,290,530 | A * | 1/1919 | Evens | B25B 13/52 81/65.2 |
| 1,380,903 | A * | 6/1921 | Haughwout | F16G 15/00 294/82.17 |
| 4,290,180 | A * | 9/1981 | Campagnolo | B25B 27/0071 29/283 |
| 5,320,021 | A * | 6/1994 | Heintz | B25B 13/52 81/3.43 |
| 9,068,911 | B2 * | 6/2015 | Wu | G01N 3/56 |
| 9,085,320 | B2 * | 7/2015 | Appleyard | B62D 1/184 |
| 2006/0219063 | A1 * | 10/2006 | Takamatsu | B25B 13/48 81/65.2 |

* cited by examiner

*Primary Examiner* — Hadi Shakeri

(57) ABSTRACT

A sprocket gripping tool has a clamp with first and second opposed jaws. The first jaw has first, second, and third holes and the second jaw has a first threaded hole and a protuberance receivable within the second hole of the first jaw. A threaded knob passes through the first hole of the first clamp and threadingly engages the second clamp to draw the jaws together. A lever arm with a grip end has a pin that engages with sprocket teeth and a hole for attaching one end of a length of roller chain. The other end of the chain attaches to the clamp. The grip end, roller chain and clamp all engage sets of sprocket teeth, so the sprocket may be torqued by the lever arm.

20 Claims, 4 Drawing Sheets

SPROCKET WRENCH WITH CLAMP

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS REFERENCE TO RELATED APPLICATION

This U.S. non-provisional utility patent application claims the benefit of and priority to U.S. provisional patent application 63/366,388 "Sprocket Wrench With Clamp," filed 14 Jun. 22. The entire contents of U.S. provisional patent application 63/366,388 "Sprocket Wrench With Clamp," filed 14 Jun. 22 are hereby incorporated into this document by reference.

FIELD

The invention relates to hand tools for gripping toothed sprockets to effectively apply torques or prevent sprockets from turning while other torques are applied.

BACKGROUND

Motorcycles, bicycles, various sorts of light duty vehicles, and motorized machinery controlled by an driver aboard the machine often use roller chains and toothed sprockets as components of the vehicle power transmission. The toothed sprocket may be threaded or press-fit onto a hub, axle, or power shaft.

Maintenance and repair of these machines may require that a twisting force to be applied to the shaft through the sprocket, or require removal of a sprocket by forced rotation with respect to the shaft.

Convenient and effective tools for applying torque or leveraged forces to a toothed sprocket have been in demand for over a century. Known devices include U.S. Pat. No. 666,131 to Cordle and U.S. patent application Ser. No. 11/412,978 to Takamatsu. Many devices such as Cordle include a lever arm and a length of a wrapping component such as roller chain which makes at least one complete wrap or more around the sprocket. Takamatsu discloses a tool having lever arm and a length of roller chain sufficient for only a partial wrap around a toothed sprocket, but in order to maintain the chain's grip on the sprocket's teeth, a magnetic element is provided at the distal end of the chain opposite from its proximal end attached to the lever arm. The lever arm of Takamatsu is a flat bar which appears flimsy against bending moments outside the plane of the sprocket being worked on. The Takamatsu arm is thus primarily suited for especially light service such as the derailleur sprockets of bicycles. Heavier duty service on motorcycles and other motorized equipment would require a more robust lever arm.

U.S. Pat. No. 5,323,671 to Herbert is an oil filter removal tool distantly related to the present problem, but it too provides more than one complete turn of its wrapping component and also provides a magnet at the distal end of this wrapping element for attachment to the steel external can portion of an oil filter.

Designs which require more than one complete turn of a wrapping component so that the end of the lever arm where the proximal end of the wrapping element is attached bears upon a distal portion of the wrapping element have an inherent disadvantage in that the length of the wrapping element limits the maximum diameter of sprocket for which such a tool may be used. Designs which use a magnet to secure a distal end of a wrapping element to the sprocket are ineffective for sprockets made of non-magnetic materials such as brasses, bronzes, aluminum, or plastic.

Thus, current demand remains for a sprocket wrench able to apply effective torque to sprockets of unlimited pitch diameter or even straight gear racks, and demand also exists for tools able to operate on non-magnetic materials.

BRIEF DESCRIPTION

A primary objective of the invention to provide a tool for gripping toothed sprockets for applying torques or leverage to the sprocket or to the shaft or hub to which the sprocket is attached.

Another objective of the invention is to provide such a tool for gripping a toothed sprocket which is not limited to gripping sprockets of any certain or maximum pitch diameter. Larger sprockets are sometimes worked on using pneumatic tools such as impact drivers, which may damage other portions of the drive train, and another objective of the invention is to provide an effective hand tool for these larger jobs so that the risk of damage by impact tools is alleviated.

Yet another corollary objective of the invention is to provide a tool for gripping toothed sprockets made of non-magnetic and non-metal materials, and another corollary objective of the invention is to provide a tool with a robust lever arm for working on medium and heavier duty sprocket and chain drive systems found on motorized vehicles and industrial equipment.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sublabel, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. Where grammatical genders are concerned, any user of the invention may be of any gender regardless of specific pronouns or grammar used in this specification. Thus, masculine grammatical forms may be interpreted to include and subsume feminine or any other grammatical genders.

In this specification, the term "means for . . . " as used herein including the claims, is to be interpreted according to 35 USC 112 paragraph 6. Also in this specification an "aperture" is variously described as and equivalent to a "hole," and a "through hole" is also written as and equivalent to a "through aperture."

The invention is a sprocket gripping tool with a clamp having first and second opposed jaws. The first jaw has first, second, and third holes and the second jaw has a first threaded hole and a protuberance receivable within the second hole of the first jaw for a threaded knob that clamps the jaws together. A lever arm with a grip end has a pin that engages with sprocket teeth and a hole for attaching one end of a length of roller chain. The other end of the chain attaches to the clamp. The grip end, roller chain and clamp all engage sets of sprocket teeth, so the sprocket may be torqued by the lever arm.

Figure 1:
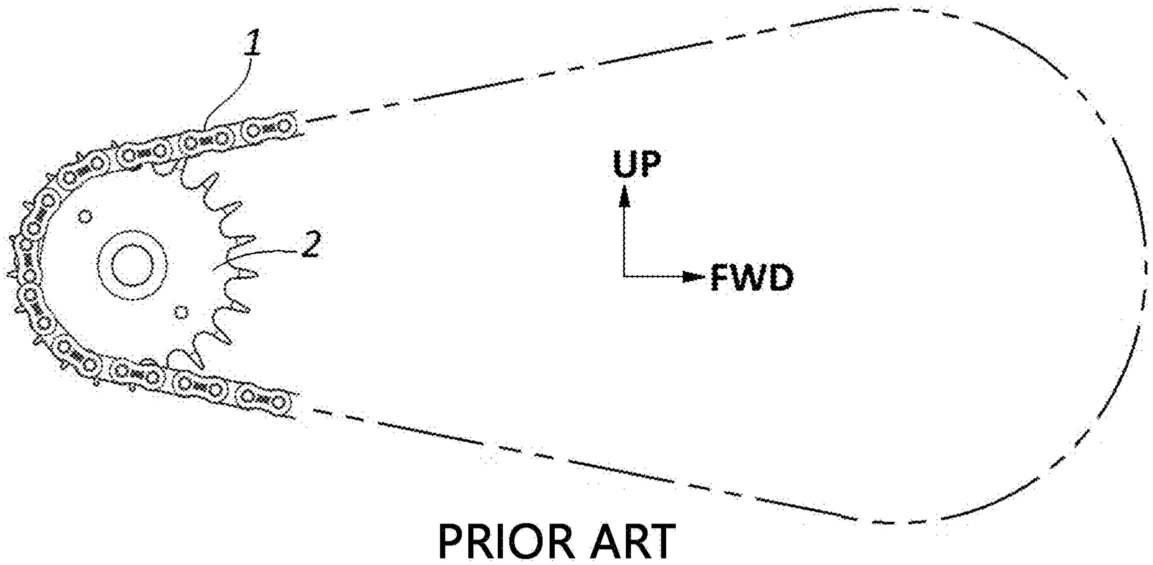
PRIOR ART Fig. 1
FIG. 1 shows a right side elevation view of a toothed chain sprocket and a portion of roller chain engaged with the sprocket teeth, and coordinate system arrows defining an upward direction for top views, and a forward direction, with bottom and rear directions being defined implicitly as opposites to these top and forward directions.

Referring now to the figures, FIG. 1 shows a right side elevation view of a toothed chain sprocket [2] and a portion of roller chain [1] engaged with the sprocket teeth, and coordinate system arrows defining an upward direction [UP] for top views and a forward direction [FWD,] with bottom and rear directions being defined implicitly as opposites to these top and forward directions.

Figure 2A:
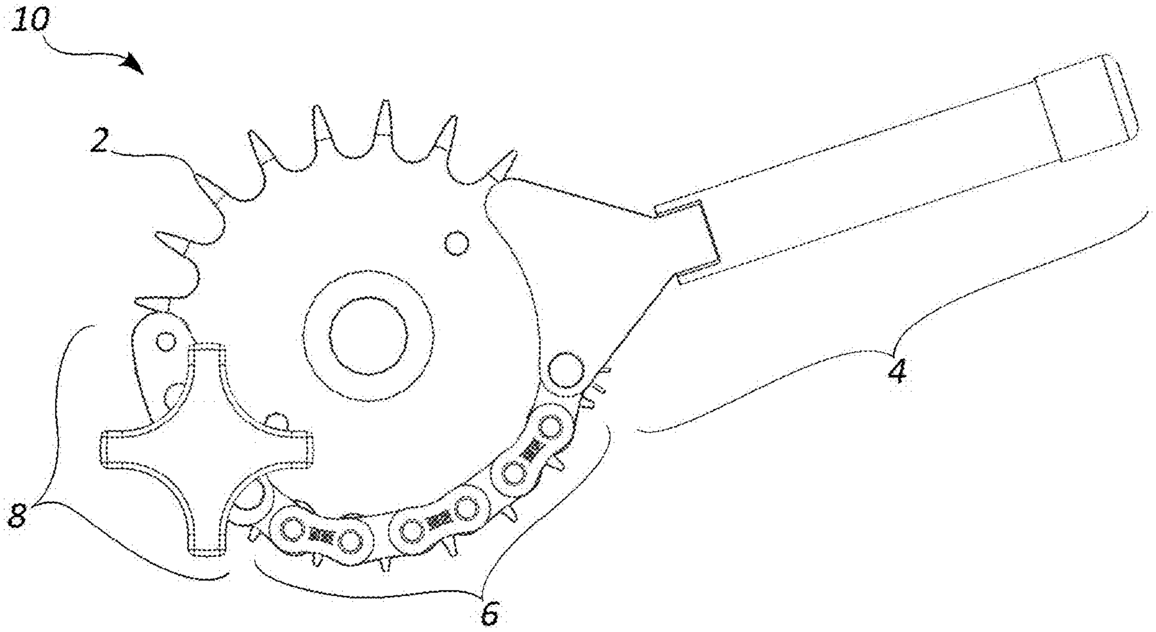
FIG. 2*a* shows a right side elevation view of an embodiment of a sprocket gripping tool in accordance with the invention secured to a sprocket for applying or resisting torque in the sprocket or its shaft or axle.

FIG. 2*a* shows a right side elevation view of an embodiment of a sprocket gripping tool [10] in accordance with the invention secured to a sprocket [2] for applying or resisting torque in the sprocket or its shaft or axle. The tool comprises a lever arm [4,] a sprocket clamp assembly [8] devised to secure and grip onto a perimeter of a toothed sprocket, and a length of roller chain [6] complementary in pitch to the diametral pitch of the toothed sprocket. With the grip end of the tool engaged with the sprocket teeth and the roller chain also aligned with and engaged with the sprocket teeth, the clamp includes complementary features on-pitch with respect to its attached roller chain, so that these features also engage positively with the radial array of sprocket teeth.

Figure 2B:
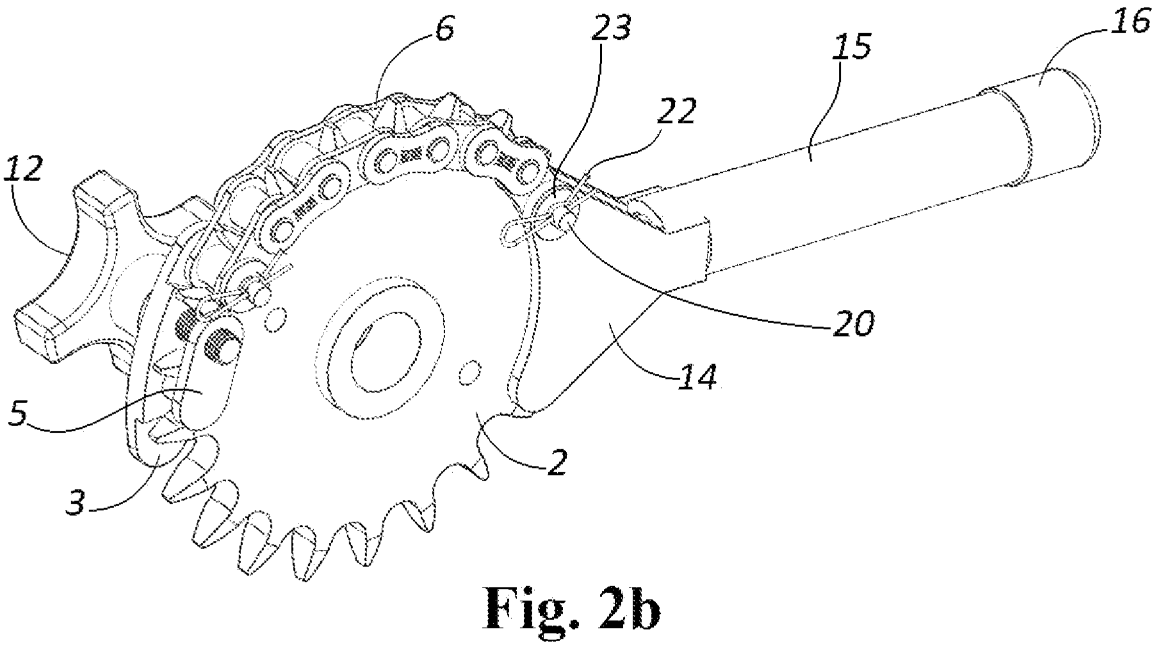
FIG. 2*b* shows an inverted, oblique, left rear bottom view of the sprocket gripping tool of FIG. 2*a*.

FIG. 2*b* shows an inverted, oblique, left rear bottom view of the sprocket gripping tool of FIG. 2*a*. The lever arm is built up from a tube or bar [15] with an end cap [16] to close off the internal passage of a tube and cover sharp edges of the end of the tube or bar of the lever arm. The grip end [14] of the lever arm further comprises a first planar membrane and a pin [20] which passes through and secures one end of a length of roller chain [6] to the grip end of the lever arm. The "grip end" in this specification is so named for it being configured to engage with and grip a portion of the sprocket teeth of the sprocket [2.] The grip or grasping of a user's hand occurs at the other end of the lever arm at or near its end cap. The other end of the roller chain is secured to a clamp having first and second opposed jaws [3] and [5] which are drawn together to prize onto the sprocket by the user turning a threaded fastener [12] configured for ease of being turned by hand. The roller chain is secured to the grip end of the lever arm by a pin [20] which may be secured by a cotter pin [22] as shown or by a similar fastener such as a ball detent pin or a quick release pin. To resist unwanted binding and reduce friction a washer [23] is deposited between the face of the grip end of the lever arm and the cotter pin.

Figure 2C:
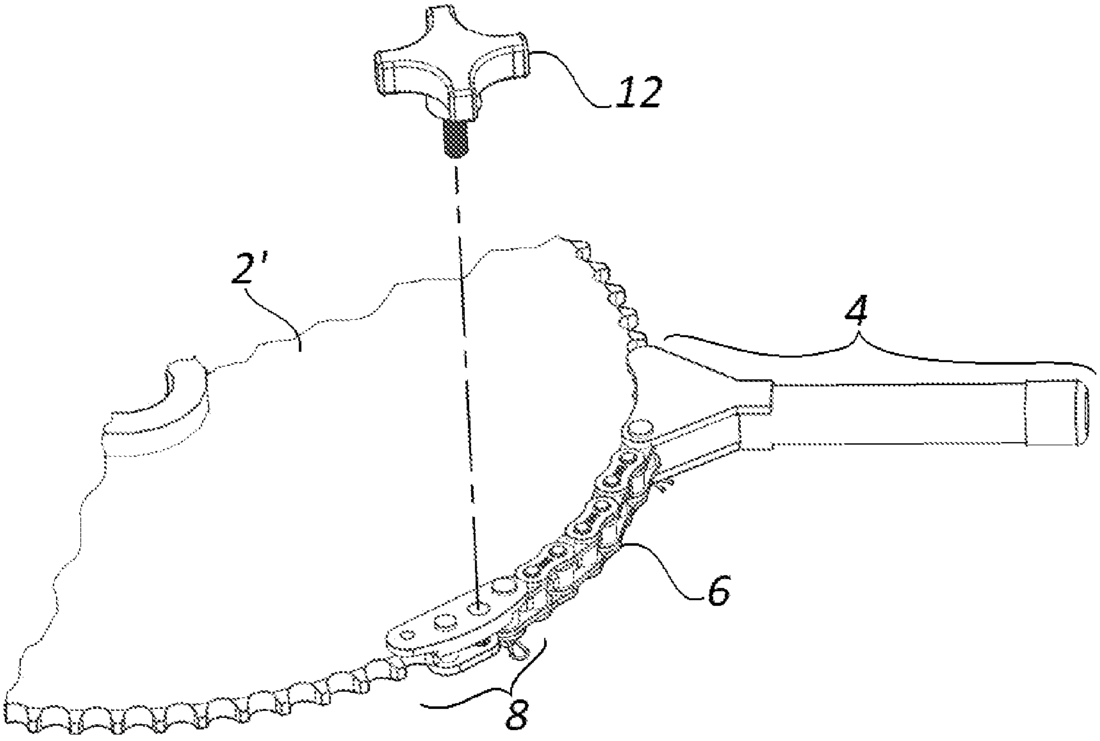
FIG. 2*c* shows an oblique, right side bottom view of the sprocket gripping tool of FIG. 2*a* engaged with a large diameter toothed sprocket.
Figure 6:
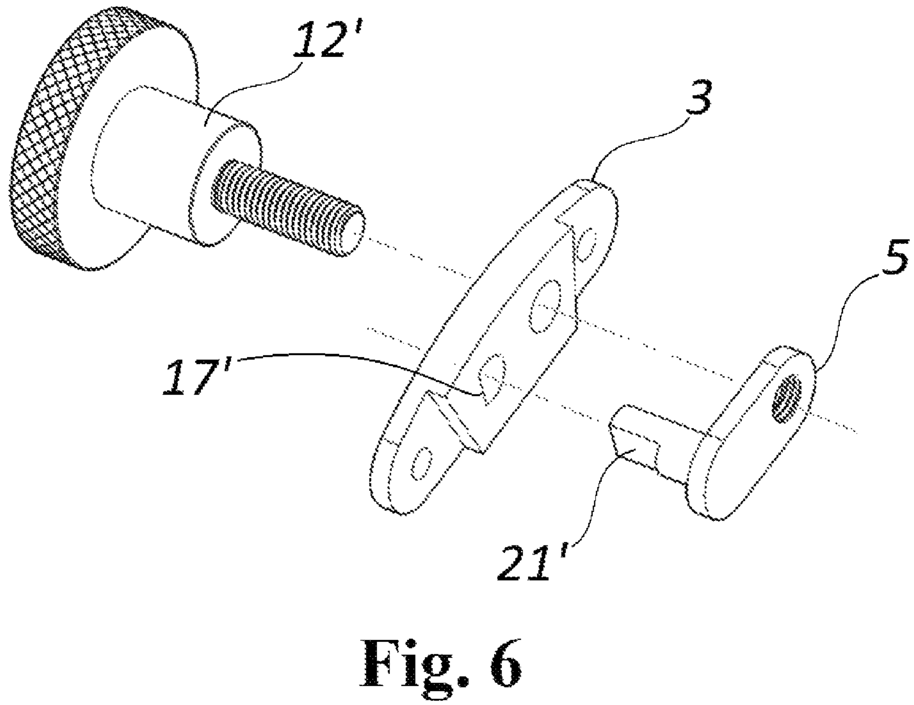
FIG. 6 shows an oblique, exploded view of alternative versions of a subset of components of the clamp subassembly subassembly seen in FIG. 4*a*.

FIG. 2*c* shows an oblique, right side bottom view of the sprocket gripping tool of FIG. 2*a* engaged with a large diameter toothed sprocket [2'.] The lever arm [4,] roller chain [6,] and clamp [8] are all engaged with the sprocket teeth on their pitch radius. The threaded fastener [12] or knob is shown detached to reveal visual details of the other components of the clamp such as its pins and through apertures. The threaded fastener may be selected from any sort of fasteners such as but not limited to a knob as depicted, or a fastener having a head with a hexagonal perimeter such as a hex-head bolt or screw, a fastener having a head with a hexagonal cavity such as a socket head cap screw, a fastener having a slotted head or a Phillips screw, a fastener having a knurled head as depicted in FIG. 6, or a fastener having a head with a radial array of protuberances such as the knob shown.

The inventor was pleasantly surprised that when working on a larger diameter sprocket with an embodiment of the tool having only a short length of chain and thus only wrapping a small portion of the circumference of its pitch radius, the tool was nevertheless surprisingly stable in applying large torques to the sprocket in circumstances where the typical approach would have been to use a pneumatic impact tool on other parts instead, such as transmission shafting. The invention thus alleviates the risk of damage posed by using such impact tools.

Figure 3:
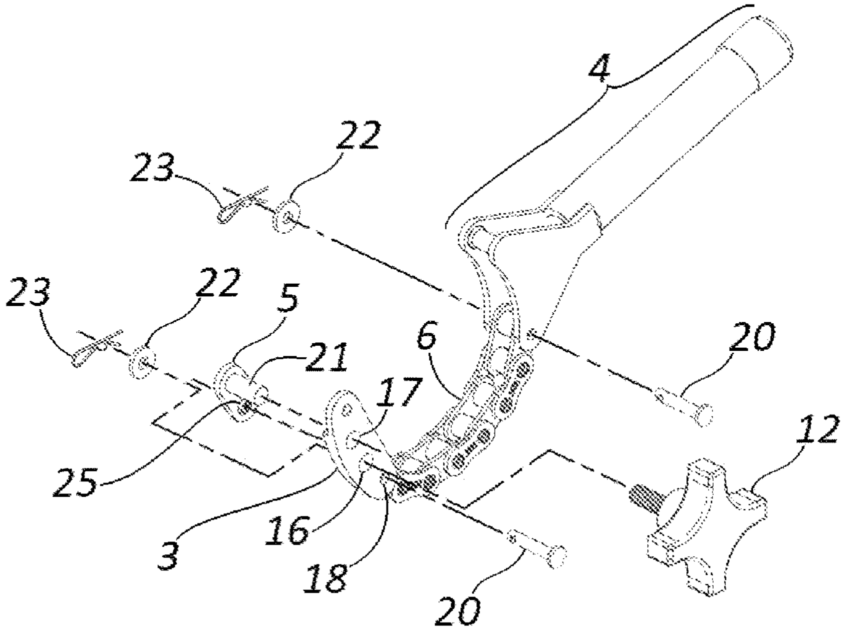
FIG. 3 shows an oblique, top right rear view of the sprocket gripping tool of FIG. 2*a* with some of its components shown exploded.

FIG. 3 shows an oblique, top right rear view of the sprocket gripping tool of FIG. 2*a* with some of its components shown exploded. The clamp components include a first jaw [3] and a second jaw [5] oriented in opposition to the first jaw. The first jaw has a first through aperture [16,] a second through aperture [17,] and third through aperture [18] having substantially parallel axes, and the second jaw has a first through aperture [25] having internal threads and a protuberance [21] of which at least a portion is complementary to and receivable within the second through aperture of the first jaw.

A first, threaded fastener [12] is receivable within and passes through the first through aperture of the first jaw and is threadingly receivable within the first through aperture of the second jaw. The knob or head is selected or made to be larger than the diameter of the first through aperture of the first jaw so that turning the fastener by its head draws the opposed jaws together to be able to clamp onto the sprocket. The second end of the roller chain is secured to the grip end of the lever arm [4] by a second fastener which in this embodiment is a pin [20] which may be secured by a cotter pin [22] as shown or by a similar fastener such as a ball detent pin or a quick release pin. To resist unwanted binding and reduce friction a washer [23] is deposited between the face of the grip end of the lever arm and the cotter pin. The first end of the roller chain is also secured to the clamp by a third fastener which is another latch pin, and that pin is secured by cotter pin and washer. As above, other latching and quick release means may be used to secure the chain to the clamp and the lever arm. The grip end of the lever arm engages the sprocket by deploying a first pin receivable within a gap between teeth of the sprocket, and a first through aperture for receiving the second fastener for securing the roller chain to it.

Figure 4A:
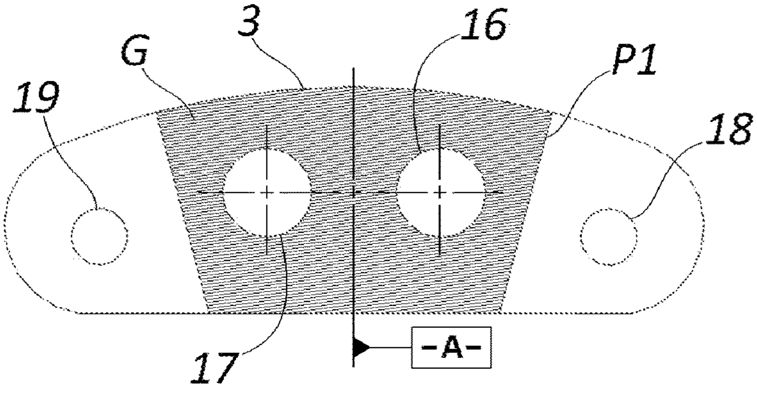
FIG. 4*a* shows a left side elevation view of a first jaw component of a clamp subassembly of the sprocket gripping tool of FIG. 2*a*.

FIG. 4*a* shows a left side elevation view of a first jaw component [3] of a clamp subassembly of the sprocket gripping tool of FIG. 2*a*. The outer contour or profile of the first jaw is symmetrical about a midplane [-A-] and the first and second through apertures [16] and [17] are arranged so that a line segment from center of the one to the other will have a perpendicular bisector that will reside within the midplane. The third through aperture [18] is matched by a fourth through aperture [19] located to be symmetric with the third through aperture about the midplane. This fourth hole allows the clamp to be assembled so that either the third or fourth hole aligns with a through hole at the end of the roller chain segment to which the clamp is attached, and with the knob orientable to extend in either direction perpendicular to the plane of the sprocket. In a preferable embodiment these three or four through holes in the jaw are all spaced apart on the same pitch as the roller chain and sprocket system. A subset of the area of this jaw is relieved so as to define a grip face [G] which is shaded in this figure. This grip face juts out as visible in FIGS. 3 and 6. The grip face has a perimeter [P1] which in some embodiments within the scope of the invention is congruent to the outer perimeter or profile of the second jaw.

Figure 4B:
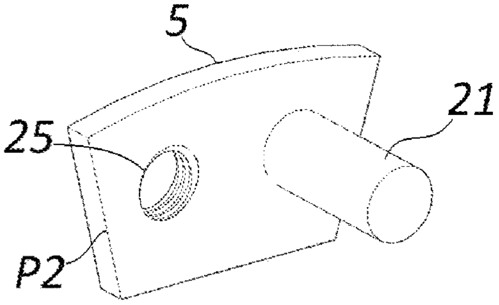
FIG. 4*b* shows an inverted, oblique, right rear bottom view of a second jaw component of the clamp subassembly seen in FIG. 4*a*.

FIG. 4*b* shows an inverted, oblique, right rear bottom view of a second jaw component [5] of the clamp subassembly seen in FIG. 4*a*. In this embodiment, this jaw has a perimeter [P2] congruent to a perimeter of the grip face seen in FIG. 4*a*. When assembled in opposition to the first jaw for clamping, the first through aperture [25] of this jaw threadingly receives the first fastener of the clamp assembly while its protuberance [21] is received into the second through aperture of the first jaw.

Figure 5:
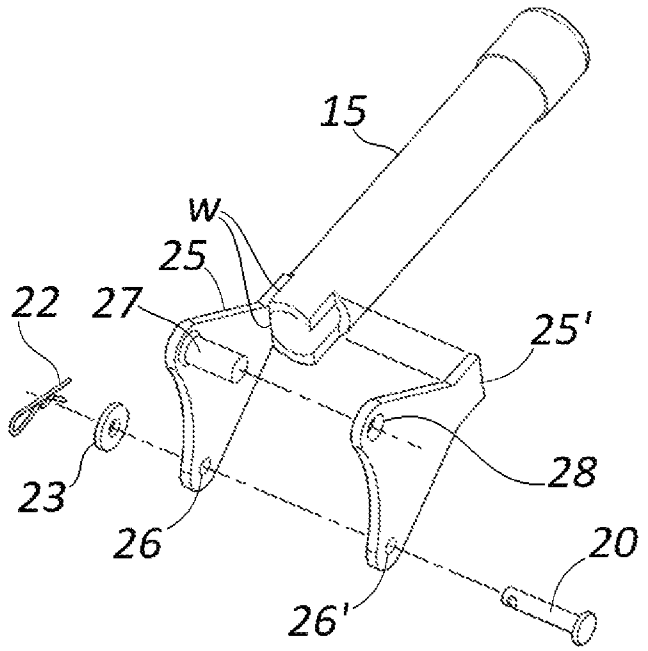
FIG. 5 shows an oblique, top right rear view of a lever arm component of the sprocket gripping tool of FIG. 2*a*.

FIG. 5 shows an oblique, top right rear view of a lever arm component of the sprocket gripping tool of FIG. 2*a*. The grip end of the lever arm [15] further comprises a first planar membrane [25,] and the pin [27] of the grip end is affixed to this planar membrane. The first through aperture [26] of the grip end also resides in this planar membrane. Although one such planar membrane or bracket may be sufficient, the grip end of this set of embodiments also and preferably includes a second planar membrane [25'] spaced apart parallel to the first planar membrane. Both membranes are affixed to the lever arm, and in the embodiment shown, unlike Takamatsu, the lever arm is a tube resistant to bending both in and outside the plane of action. Some preparation of the end of the tube allows the membranes to be affixed to the tube end by welding [w.]

The pin of this grip end resides between the first and second planar membranes and is also affixed to the second membrane, and may be permanently affixed such as by a press-fit, brazing, or welding. The second membrane also has a through hole [26'] coaxial with the first through hole of the first planar membrane. These coaxial holes receive a second fastener [20] which is secured by a cotter pin [22] and a friction reducing washer [23.] The roller chain is attached to the grip end of the lever arm by this fastener.

FIG. 6 shows an oblique, exploded view of alternative versions of a subset of components of the clamp subassembly seen in FIG. 4*a*. A portion of an opposing face of the first jaw [3] is a grip face relieved from this opposing face. The first and second through apertures of the first jaw pass through this grip face. In this embodiment the second through aperture [17'] is a shape other than a round hole, and there is a complementary portion [21'] of the protuberance of the second jaw [5] which is also other than round, so that with this other than round portion of the protuberance received within the second through aperture, rotation of the second jaw about an axis of the protuberance is prevented. Square holes and square pegs or complementary sets of pegs and holes having other polygonal sections provide similar benefits of locking the orientation of the second jaw to the first jaw, especially in embodiments where the grip face of the first jaw is the same shape as the perimeter of the second jaw.

Also, while an other than round portion of the protuberance is received within the second through aperture, the first through aperture of the first jaw maintains coaxially alignment with the first through aperture of the second jaw, so that insertion and threading of the threaded fastener and assembly of the clamp components is much easier than with looser parts where the threaded hole of the second jaw might swivel out of alignment with the first hole of the first jaw. The threaded fastener [12'] in this embodiment is a knob having a knurled head.

While certain features and aspects have been described with respect to exemplary embodiments, one skilled in the art will recognize that numerous modifications are possible. Also, while certain functionality is ascribed to certain system components, unless the context dictates otherwise, this functionality may be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems.

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Thus, unauthorized instances of apparatuses and methods claimed herein are to be considered infringing, no matter where in the world they are advertised, sold, offered for sale, used, possessed, or performed.

Consequently and in summary, although many exemplary embodiments are described above, it will be appreciated that the invention is intended to cover all modifications and equivalents within the scope of the following claims.

What is claimed is:

1. A clamp for a sprocket of a tooth and sprocket system defining a diametral pitch, comprising first and second opposed jaws, with said first jaw comprising first, second, and third through apertures having parallel axes and said second jaw comprising a first through aperture having internal threads and a protuberance of which at least a portion is complementary to and receivable within said second through aperture of said first jaw, and a threaded fastener receivable within said first through aperture of said first jaw, threadingly receivable within said first through aperture of said second jaw, and having a head larger than a diameter of said first through aperture of said first jaw, wherein a roller chain defines a pitch complementary to said diametral pitch of said tooth and sprocket system, and wherein at least two from among said first, second and third through apertures are spaced apart by said pitch.

2. The clamp of claim 1, wherein a portion of an opposing face of said first jaw is a grip face relieved from said opposing face, and said first and second through apertures of said first jaw pass through said grip face.

3. The clamp of claim 2, wherein a perimeter of said second jaw is congruent to a perimeter of said grip face.

4. The clamp of claim 2, wherein said grip face is configured to engage sprocket teeth at a pitch radius of said sprocket.

5. The clamp of claim 1, wherein said second through aperture of said first jaw is other than round, and said complementary portion of said protuberance of said second jaw is also other than round, so that with said other than round portion of said protuberance received within said second through aperture, rotation of said second jaw about an axis of said protuberance is prevented.

6. The clamp of claim 5, wherein while said other than round portion of said protuberance is received within said second through aperture, said first through aperture of said first jaw is coaxially aligned with said first through aperture of said second jaw.

7. The clamp of claim 5, wherein said second through aperture of said first jaw comprises a polygonal section, and said complementary portion of said protuberance of said second comprises a complementary polygonal section.

8. The clamp of claim 1, wherein said threaded fastener is a fastener selected from the set of fasteners consisting of:

a fastener having a head with a hexagonal perimeter, a fastener having a head with a hexagonal cavity, a socket head cap screw, a fastener having a slotted head, a Phillips screw, a fastener having a knurled head, and a fastener having a head with a radial array of protuberances.

9. The clamp of claim 1, wherein said first jaw comprises a relieved grip face configured to engage sprocket teeth.

10. A sprocket gripping tool, comprising a clamp for a sprocket of a tooth and sprocket system defining a diametral pitch, further comprising first and second opposed jaws, with said first jaw comprising first, second, and third through apertures having parallel axes and said second jaw comprising a first through aperture having internal threads and a protuberance of which at least a portion is complementary to and receivable within said second through aperture of said first jaw, and a first, threaded fastener receivable within said first through aperture of said first jaw, threadingly receivable within said first through aperture of said second jaw, and having a head larger than a diameter of said first through aperture of said first jaw;

a lever arm having a grip end comprising a first pin receivable within a gap between teeth of a sprocket, and a first through aperture for receiving a second fastener; and a length of roller chain having its first end secured by said second fastener to said grip end of said lever arm, and its second end secured by a third fastener to said clamp, wherein said roller chain defines a pitch complementary to a tooth and sprocket system having a diametral pitch, and at least two from among said first, second, and third through apertures of said first jaw are spaced apart by said pitch.

11. The sprocket gripping tool of claim 10, wherein a portion of an opposing face of said first jaw is a grip face relieved from said opposing face, and said first and second through apertures of said first jaw pass through said grip face.

12. The sprocket gripping tool of claim 11, wherein a perimeter of said second jaw is congruent to a perimeter of said grip face.

13. The sprocket gripping tool of claim 10, wherein said second through aperture of said first jaw is other than round, and said complementary portion of said protuberance of said second jaw is also other than round, so that with said other than round portion of said protuberance received within said second through aperture, rotation of said second jaw about an axis of said protuberance is prevented.

14. The sprocket gripping tool of claim 13, wherein while said other than round portion of said protuberance is received within said second through aperture, said first through aperture of said first jaw is coaxially aligned with said first through aperture of said second jaw.

15. The sprocket gripping tool of claim 10, wherein said threaded fastener is a fastener selected from the set of fasteners consisting of:

a fastener having a head with a hexagonal perimeter, a fastener having a head with a hexagonal cavity, a socket head cap screw, a fastener having a slotted head, a Phillips screw, a fastener having a knurled head, and a fastener having a head with a radial array of protuberances.

16. The sprocket gripping tool of claim 10, wherein said grip end of said lever arm further comprises a first planar membrane and said pin of said grip end is affixed to said planar membrane, and said first through aperture of said grip end resides in said planar membrane.

17. The sprocket gripping tool of claim 16, wherein said grip end further comprises a second planar membrane spaced apart parallel to said first planar membrane.

18. The sprocket gripping tool of claim 17, wherein said pin of said grip end resides between said first and second planar membranes and is also affixed to said second membrane, and said second membrane further comprises a through aperture coaxial with said first through aperture of said first planar membrane.

19. The sprocket gripping tool of claim 10, wherein two through apertures from among said first, second, and third through apertures passing through said first jaw are arranged symmetrically about a midplane of said first jaw.

20. The sprocket gripping tool of claim 19, wherein said first jaw further comprises a fourth through aperture having an axis parallel to axes of said first, second, and third through apertures.

* * * * *